United States Patent
Anderson et al.

(10) Patent No.: US 11,703,882 B2
(45) Date of Patent: Jul. 18, 2023

(54) BIO-HYBRID ODOR-GUIDED AUTONOMOUS PALM-SIZED AIR VEHICLE

(71) Applicant: U.S. Government as represented by the Secretary of the Air Force, Wright-Patterson AFB, OH (US)

(72) Inventors: Melanie Anderson, Redmond, WA (US); Kevin Brink, Fort Walton Beach, FL (US); Thomas Daniel, Seattle, WA (US); Sawyer Fuller, Seattle, WA (US); Joseph Sullivan, Redmond, WA (US); Jennifer Talley, Niceville, FL (US)

( * ) Notice: Subject to any disclaimer, the term of this patent is extended or adjusted under 35 U.S.C. 154(b) by 125 days.

(21) Appl. No.: 16/879,296

(22) Filed: May 20, 2020

(65) Prior Publication Data
US 2020/0371530 A1   Nov. 26, 2020

Related U.S. Application Data

(60) Provisional application No. 63/023,992, filed on May 13, 2020, provisional application No. 62/851,021, filed on May 21, 2019.

(51) Int. Cl.
G05D 1/00 (2006.01)
G05D 1/02 (2020.01)
(Continued)

(52) U.S. Cl.
CPC ......... G05D 1/0274 (2013.01); B64C 39/024 (2013.01); B64C 39/028 (2013.01);
(Continued)

(58) Field of Classification Search
CPC .. G05D 1/0274; G05D 1/0038; G05D 1/0044; B64C 39/024; B64C 39/028;
(Continued)

(56) References Cited

U.S. PATENT DOCUMENTS

| 9,995,847 | B2 * | 6/2018 | Kalagnanam | G01W 1/10 |
| 2017/0115218 | A1 * | 4/2017 | Huang | B60R 11/04 |
| 2017/0255198 | A1 * | 9/2017 | Rodriguez | G05D 1/0088 |

FOREIGN PATENT DOCUMENTS

| CN | 100594361 C | 3/2010 |
| CN | 103365297 A | 10/2013 |
| WO | WO2016020270 A1 | 2/2016 |

OTHER PUBLICATIONS

Castro, A, et al. Odor Source Localization on a Nano Quad Copter. 2018 IEEE Biomedical Circuits and Systems Conference, Oct. 17-19, 2018, [online], [retrieved on Feb. 25, 2022], Retrieved from the Internet <https://ieeexplore.ieee.org/abstract/document/8584769/> (Year: 2018).*

(Continued)

*Primary Examiner* — Peter D Nolan
*Assistant Examiner* — Peter Y Ning
(74) *Attorney, Agent, or Firm* — AFMCLO/JAZ; Timothy M. Barlow

(57) ABSTRACT

A bio-hybrid odor-localizing autonomous air vehicle includes an airborne robotic platform having a navigation platform, a wireless transmitter communicatively coupled to a management console, and a biological sensor mounted on the airborne robotic platform that reacts to at least one olfactory odor. A controller is communicatively coupled to the airborne robotic platform, the navigation platform, and the biological sensor. The controller monitors the biological sensor. In response to the biological sensor detecting the at least one olfactory odor, the controller directs the airborne platform to three-dimensionally map an olfactory plume of the at least one olfactory odor using an olfactory-driven search pattern. The controller stores the three-dimensional map for later retrieval or transmits the three-dimensional map of the olfactory plume to the management console via the wireless transmitter.

18 Claims, 12 Drawing Sheets
(4 of 12 Drawing Sheet(s) Filed in Color)

(51) Int. Cl.
*B64C 39/02* (2023.01)
*H04W 4/40* (2018.01)

(52) U.S. Cl.
CPC ......... *G05D 1/0038* (2013.01); *G05D 1/0044* (2013.01); *H04W 4/40* (2018.02); *B64C 2201/127* (2013.01)

(58) Field of Classification Search
CPC .......... B64C 2201/127; B64C 2201/12; B64C 2201/14; H04W 4/40
See application file for complete search history.

(56) References Cited

OTHER PUBLICATIONS

Martinez, D., et al. Using Insect Electroantennogram Sensors on Autonomous Robots for Olfactory Searches. J. Vis. Exp. (90), e51704, doi:10.3791/51704 [online], [retrieved on Feb. 25, 2022], Retrieved from the Internet <https://pubmed.ncbi.nlm.nih.gov/25145980/> (Year: 2014).*

Martinez D, Arhidi L, Demondion E, Masson JB, Lucas P. Using insect electroantennogram sensors on autonomous robots for olfactory searches. J Vis Exp. 2014;(90):e51704. Published Aug. 4, 2014. doi:10.3791/51704.

Burgués J, Hernandez V, Lilienthal AJ, Marco S. Smelling Nano Aerial Vehicle for Gas Source Localization and Mapping. Sensors (Basel). 2019;19(3):478. Published Jan. 24, 2019. doi:10.3390/s19030478.

Rosser, K.; Pavey, K.; FitzGerald, N.; Fatiaki, A.; Neumann, D.; Carr, D.; Hanlon, B.; Chahl, J. Autonomous Chemical Vapour Detection by Micro UAV. Remote Sens. 2015, 7, 16865-16882.

Ishida, Haruki, Yuuki Wada and Haruka Matsukura "Chemical Sensing in Robotic Applications: A Review." IEEE Sensors Journal 12 (2012): 3163-3173.

Lino Marques, Urbano Nunes, Anibal T. de Almeida, Olfaction-based mobile robot navigation, Thin Solid Films, vol. 418, Issue 1, 2002, pp. 51-58, ISSN 0040-6090, https://doi.org/10.1016/S0040-6090(02)00593-X.

Kuwana, Yoshihiko ; Nagasawa, Sumito ; Shimoyama, Isao ; Kanzaki, Ryohei. / Synthesis of the pheromone-oriented behaviour of silkworm moths by a mobile robot with moth antennae as pheromone sensors In: Biosensors and Bioelectronics. 1999 ; vol. 14, No. 2. pp. 195-202. https://shibaura.pure.elsevier.com/en/publications/synthesis-of-the-pheromone-oriented-behaviour-of-silkworm-moths-b.

Hiroshi Ishida, Takamichi Nakamoto, Toyosaka Moriizumi, Timo Kikas, and Jiri Janata, Plume-Tracking Robots: A New Application of Chemical Sensors, The Biological Bulletin 2001 200:2, 222-226. https://ieeexplore.ieee org/abstract/document/6247459/.

Kowadlo, Gideon and R. Andrew Russell. "Robot Odor Localization: A Taxonomy and Survey " The International Journal of Robotics Research 27 (2008): 869-894. https://journals.sagepub.com/doi/pdf/10.1177/0278364908095118.

Myrick AJ, Park KC, Hetling JR, Baker TC. Real-time odor discrimination using a bioelectronic sensor array based on the insect electroantennogram. Bioinspir Biomim. 2008;3(4):046006. doi:10.1088/1748-3182/3/4/046006. https://www. icbi.nlm.nih.gov/pubmed/18997275.

\* cited by examiner

BIO-HYBRID ODOR-GUIDED AUTONOMOUS PALM-SIZED AIR VEHICLE

CROSS-REFERENCE TO RELATED APPLICATIONS

This application claims the benefit of priority under 35 U.S.C. § 119(e) to U.S. Provisional Application Ser. No. 62/851,021 entitled "A Bio-Hybrid Odor-Guided Autonomous Palm-Sized Air Vehicle", filed 21 May 2019, the contents of which are incorporated herein by reference in their entirety.

This application claims the benefit of priority under 35 U.S.C. § 119(e) to U.S. Provisional Application Ser. No. 63/023,992 entitled "A Bio-Hybrid Odor-Guided Autonomous Palm-Sized Air Vehicle", filed 13 May 2020, the contents of which, including references cited therein, are incorporated herein by reference in their entirety.

ORIGIN OF THE INVENTION

This invention was made with government support under Grant No. FA9550-14-1-0398 awarded by the Air Force Office of Scientific Research and assigned to United States Government and may be manufactured and used by or for the Government of the United States of America for governmental purposes without the payment of any royalties thereon or therefore.

BACKGROUND

1. Technical Field

The present disclosure generally relates to autonomous vehicles having sensors that detect characteristics of the air, and more particularly to autonomous airborne vehicles having olfactory sensing.

2. Description of the Related Art

Robotic airborne chemical source localization has critical applications ranging from search and rescue to hazard detection of pollution assessment. Previous demonstrations on flying robots have required search times in excess of ten minutes, or required computation intensive signal processing, largely because slow response of semiconductor gas sensors. Generally known systems for mapping and tracking an odor plume using an olfactory sensor require detection of the prevailing airflow using heavy sensors or a comparison between global positioning system (GPS) speed and visual ground track. The former prevents use of convenient, lightweight platforms and the latter prevents use indoors or in the presence of a GPS spoofer or jammer. Generally-known olfactory sensors are too slow for airborne sensing, especially three-dimensional mapping of an olfactory plume that rapidly changes with time.

SUMMARY

The present innovation overcomes the foregoing problems and other shortcomings, drawbacks, and challenges of mapping olfactory plumes. While the present innovation will be described in connection with certain embodiments, it will be understood that the invention is not limited to these embodiments. To the contrary, this invention includes all alternatives, modifications, and equivalents as may be included within the spirit and scope of the present invention.

According to one aspect of the present disclosure, a bio-hybrid odor-localizing autonomous air vehicle ("smellicoper") includes an airborne robotic platform. The smellicopter includes a navigation platform coupled to the airborne robotic platform. The smellicopter includes a biological sensor mounted on the airborne robotic platform that reacts to at least one olfactory odor. A controller of the smellicopter is communicatively coupled to the airborne robotic platform, the navigation platform, and the biological sensor. The controller monitors the biological sensor. In response to the biological sensor detecting the at least one olfactory odor, the controller directs the airborne platform to map an olfactory plume of the at least one olfactory odor using an olfactory-driven search pattern.

According to another aspect of the present disclosure, a bio-hybrid odor-localizing autonomous air vehicle (smellicopter) includes an airborne robotic platform comprising a drone copter. The smellicopter includes a navigation platform coupled to the airborne robotic platform. The smellicopter includes a wireless transmitter communicatively coupled to a management console. The smellicopter includes a memory containing an olfactory-driven search pattern. A biological sensor is mounted on the airborne robotic platform. The biological sensor reacts to at least one olfactory odor. A controller is communicatively coupled to the airborne robotic platform, the navigation platform, the wireless transmitter, the memory, and the biological sensor. The controller monitors the biological sensor. In response to the biological sensor detecting the at least one olfactory odor, the controller directs the airborne platform to map an olfactory plume of the at least one olfactory odor using an olfactory-driven search pattern. The controller associates detection of the olfactory plume with a location based on the navigation platform. The controller stores data of the mapping of the olfactory plume in the memory. The controller transmits a completed map to the management console using the wireless transmitter.

According to an additional aspect of the present disclosure, a method includes monitoring a biological sensor that reacts to at least one olfactory odor mounted on an airborne robotic platform of a bio-hybrid odor-localizing autonomous air vehicle. In response to the biological sensor detecting the at least one olfactory odor, the method includes directing the airborne platform to map an olfactory plume of the at least one olfactory odor using an olfactory-driven search pattern. The method includes associating detection of the olfactory plume with a location based on a navigation platform mounted on the airborne robotic platform. The method includes storing data of the mapping of the olfactory plume in a memory.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. The patent or application file contains at least one drawing executed in color. Copies of this patent or patent application publication with color drawing(s) will be provided by the Office upon request and payment of the necessary fee. Embodiments incorporating teachings of the present disclosure are shown and described with respect to the figures presented herein, in which.

DETAILED DESCRIPTION

Figure 1A:
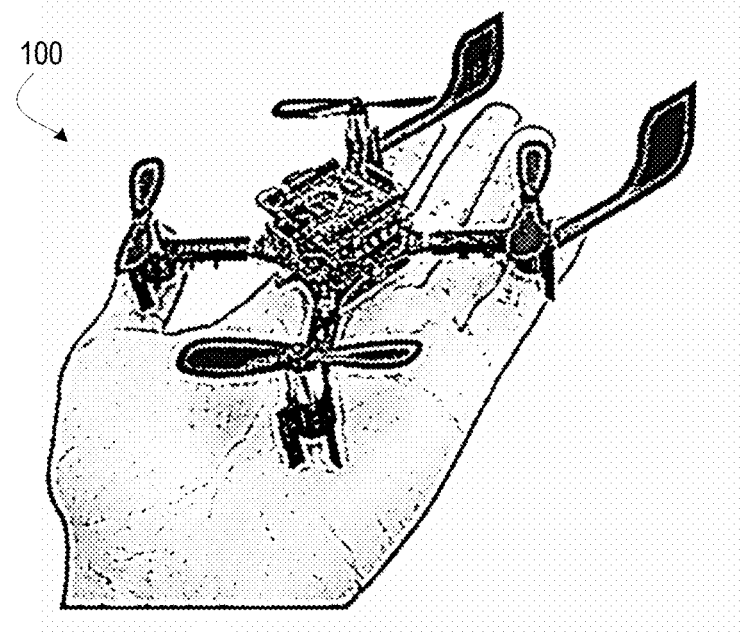
FIG. 1A depicts a bio-hybrid odor-guided autonomous palm-sized air vehicle ("Smellicopter"), according to one or more embodiments.

Biohybrid systems integrate living materials with synthetic devices, exploiting their respective advantages to solve challenging engineering problems. One challenge of critical importance to society is detecting and localizing airborne volatile chemicals. Many flying animals depend their ability to detect and locate the source of aerial chemical plumes for finding mates and food sources. A robot with comparable capability could reduce human hazard and drastically improve performance on tasks such as locating disaster survivors, hazardous gas leaks, incipient fires, or explosives. Three advances are needed before they can rival their biological counterparts: 1) a chemical sensor with a much faster response time that nevertheless satisfies the size, weight, and power (SWaP) constraints of flight, 2) a design, sensor suite, and control system that allows it to move toward the source of a plume fully autonomously while navigating obstacles, and 3) the ability to detect the plume with high specificity and sensitivity amongst the assortment of chemicals that invariably exist in the air. Here we address the first two, introducing a human-safe palm-sized air vehicle equipped with the odor-sensing antenna of an insect, the first odor-sensing biohybrid robot system to fly. Using this sensor along with a suite of additional navigational sensors, as well as passive wind fins, our robot orients upwind and navigates autonomously toward the source of airborne plumes. Our robot is the first flying biohybrid system to successfully perform odor localization in a confined space, and it is able to do so while detecting and avoiding obstacles in its flight path. We show that insect antennae respond more quickly than metal oxide gas sensors, enabling the fastest odor localization ever demonstrated by a flying robot. By using the insect chemosensory apparatus, we anticipate a feasible path toward improved chemical specificity and sensitivity by leveraging recent advances in gene editing.

Introduction: Enabled by revolutionary advances in genetic engineering, artificial intelligence, and ubiquitous computing, there has been an explosion of research integrating living and synthetic systems. From robotic prostheses for amputees [1], to implantable deep brain stimulation chips [2], to reprogrammed cellular organisms [3], such biohybrid technologies have yielded breakthroughs in problems at the intersection of biology and engineering. In addition to the deployment of devices into living systems, the complimentary arrangement of integrated living materials with robotic devices—Biohybrid Robotics—is an emerging technology. Indeed, a casual survey of scientific and engineering literature reveals exponential growth in the number of publications associated with the phrase "Biohybrid Robot". Examples of this include utilizing biological cells and tissues as living actuators in artificial machines [4], or creating a biohybrid robot from a living system, such as a jellyfish, by embedding control electronics [5]. In Biohybrid Robotics, living systems are exploited to exceed what is possible in strictly man-made systems.

Robotic odor localization in natural and artificial environments is an open challenge of critical importance in life-saving applications. A robot with appropriate chemical sensing capabilities could be used to locate trapped survivors in a disaster, to search for leaks of hazardous chemicals in industrial settings, or to locate explosives or chemical warfare agents in conflict zones. These tasks are well suited to robots because they pose substantial risk to humans or canines. In addition, odor localizing robots could reduce the work of first responders in a disaster by allowing fewer people to search larger areas for survivors. Despite ample research interest and motivation for odor localizing robots, the limited odor sensing performance and stringent size, weight, and power (SWaP) constraints of small robots have hampered their widespread use for such applications.

In contrast, chemical sensing is a universal capability of living organisms across all scales and taxa. Most animals depend on this ability for their survival. Combined with a suitable search strategy, animals can use chemosensing to find the source of chemical emissions which may come from potential mates or food sources [6]. Moreover, flying animals have evolved sophisticated sensing capabilities and olfactory search behaviors that allow them to efficiently search in highly complex three-dimensional (3D) environments such as the forest canopy, which include myriad obstacles and turbulent flow. For example, male moths can track females over great distances, detecting female pheromones at concentrations far less than parts per trillion [7]. Female mosquitos use a sense of carbon dioxide to find food [8], and fruit flies sense ethanol [9].

Recent research has strived to approach the remarkable odor search capability of living systems using robots. Flying robots are well suited to this task as they can search for odor sources at various altitudes, avoid difficult terrain, and manage obstacles without sophisticated ambulatory systems. Important advances in plume source localization with flying robots include a 1 m multi-rotor drone that follows an outdoor methane plume to its source in two-dimensional space [10]. This drone used semiconductor metal oxide (MOX) sensors, which have low chemical specificity, a slow rise time and long refractory period in the presence of high gas concentrations [11]. To achieve reliable readings, the drone must pause at each sampling location for 20 seconds for the sensor to stabilize, necessitating a search time lasting tens of minutes, nearly as long as the drone's battery life. In another recent work, Luo et.al. [12] showed that with improved signal processing, an array of MOX sensors could extract odor information from a plume on a short timescale. However, their signal processing algorithm is computationally intensive, and requires constant communication to an offboard computer with a powerful GPU. In [13], scientists calibrated a MOX sensor and used it to sense an indoor chemical source on a palm-sized drone. They were able to consistently locate odor sources, but their approach relied an external absolute positioning system, a map of the room, and repeated traverses, which are not typically available in environments of practical interest. Other work on source localization has investigated different sources such as light which allows a gradient search unaffected by wind.

One example of this shows that a small drone platform carrying a light sensor can use a deep reinforcement learning policy to find the source of a light even in the presence of obstacles [14]. Hence the state of the art continues to be challenged by the speed and reliability of suitably small synthetic chemical sensors and size-constrained navigation systems.

A distinguishing characteristic of plume tracking by animals is the use of near-instantaneous information present in the plume [6] [15]. Plumes in the air typically consists of a patchy distribution of filaments containing high chemical concentration interspersed among large areas of low concentration. This is because convection dominates over diffusion for transport in atmospheric flow, which is turbulent [6].

Biological odor detectors, such as moth antennae, outperform state-of-the-art (engineered) portable chemical sensors in detection speed, sensitivity, and chemical selectivity. The extreme sensitivity and rapid response times of natural chemical sensing arises, in part, from an energy dependent G protein-coupled amplification system that can convert single molecule detections into electrical signals in odor-detecting neurons of the moth antennae [16]. These electrical signals, known as electroantennograms (EAG), can be measured using highly sensitive amplifiers.

Use of EAGs coupled to the antennae of moths has been previously demonstrated on mobile robots for chemical plume tracking. Notable examples of biohybrid robotic systems using living sensors include a ground-based mobile robot in a wind tunnel using a moth EAG [17], an odor tracking mobile robot steered based on input from a moths' ambulation motions on a sensitive trackball [18], and a ground robot capable of avoiding collisions by using a fly's visual system to perform optic flow estimates [19].

In this work, we introduce, for the first time, the use of an insect's chemosensory apparatus on a flying robot. By doing so, we leverage the sophisticated and fast G-protein-mediated chemosensing capabilities that have evolved in biology to provide a sensor with a speed that better matches rapid motions possible with flight. Our EAG-based system uses antennae from the hawkmoth *Manduca sexta* to provide for a lightweight (1.5 grams) and extremely low-power (2.7 milliwatts) sensor. We show that it has a much faster response than MOX sensors, and deploy it on a small, palm-sized 30 g hovering four-rotor aircraft. We then equipped this biohybrid system with a sensor suite that allowed it to control its position and avoid obstacles while moving through confined spaces fully autonomously. To enable the robot to navigate a chemical plume, we additionally introduced wind fins fixed to the robot, which cause it to passively orient into the wind. This allows for a simple, reactive search that relies on the robot operating in a coordinate system rotated to a wind-oriented reference frame at all times. With this system, we showed that the robot was able to navigate to the source of an airborne odor plume in a confined wind tunnel with and without obstacles using a bio-inspired cast-and-surge strategy, without any need for external position information such as from the Global Positioning System (GPS).

The aggregation of these advances represents a significant advance in robotic plume source localization because with them we are able to, for the first time, quickly and fully autonomously, navigate to a chemical plume source in a complex environment including obstacles as would be encountered in many real-world applications. Furthermore, we anticipate that our biological sensor has the potential for designing chemical specificity using recent advances in genetic engineering to express chemical-specific chemosensors [20].

Figure 1B:
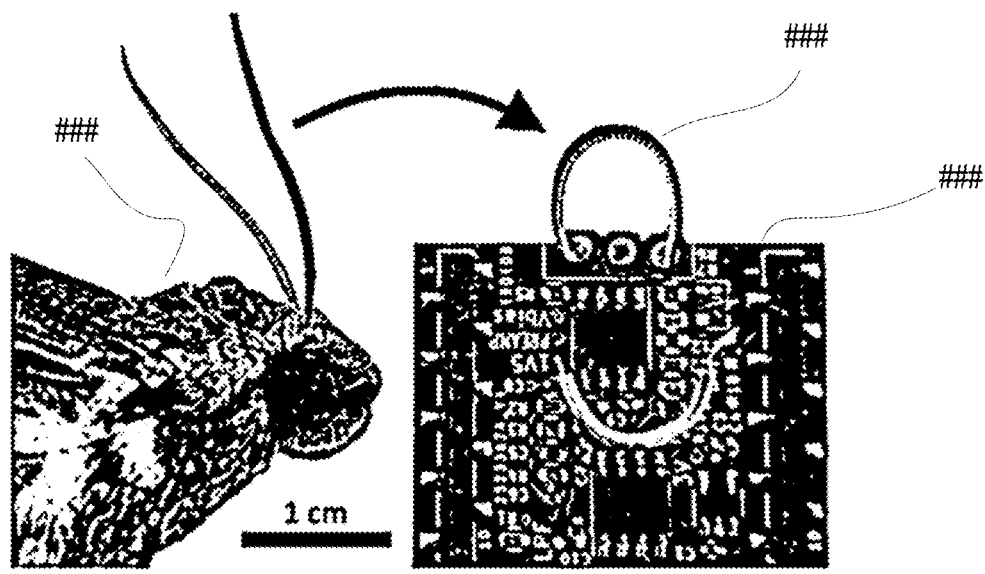
FIG. 1B depicts a detailed view of an antenna signal amplifier deck of the Smellicopter of FIG. 1A that includes biological sensor taken from the head of a *Manduca sexta* moth.
Figure 1C:
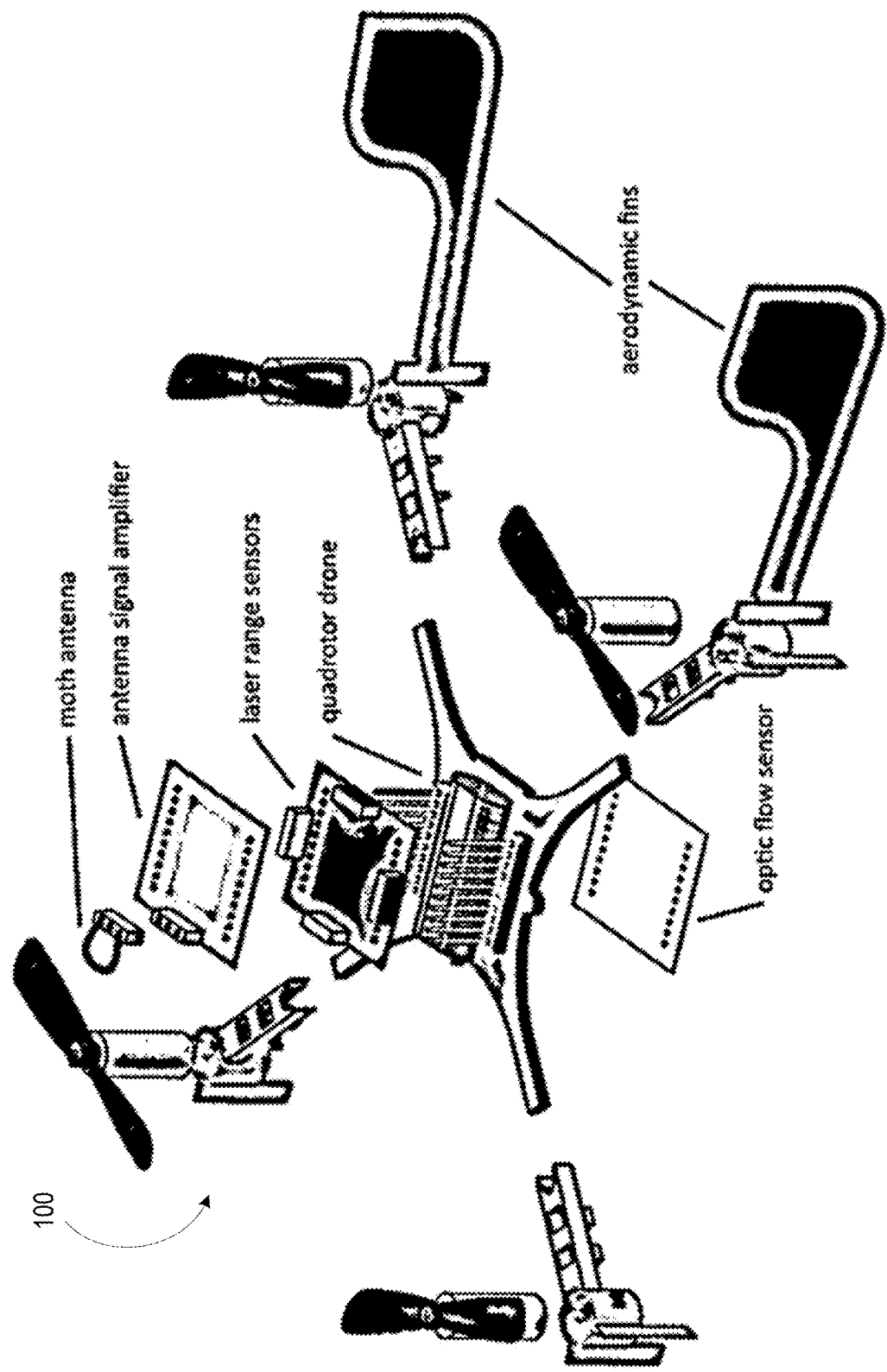
FIG. 1C depicts a three-dimensional disassembled view of the Smellicopter, according to one or more embodiments.
Figure 1D:
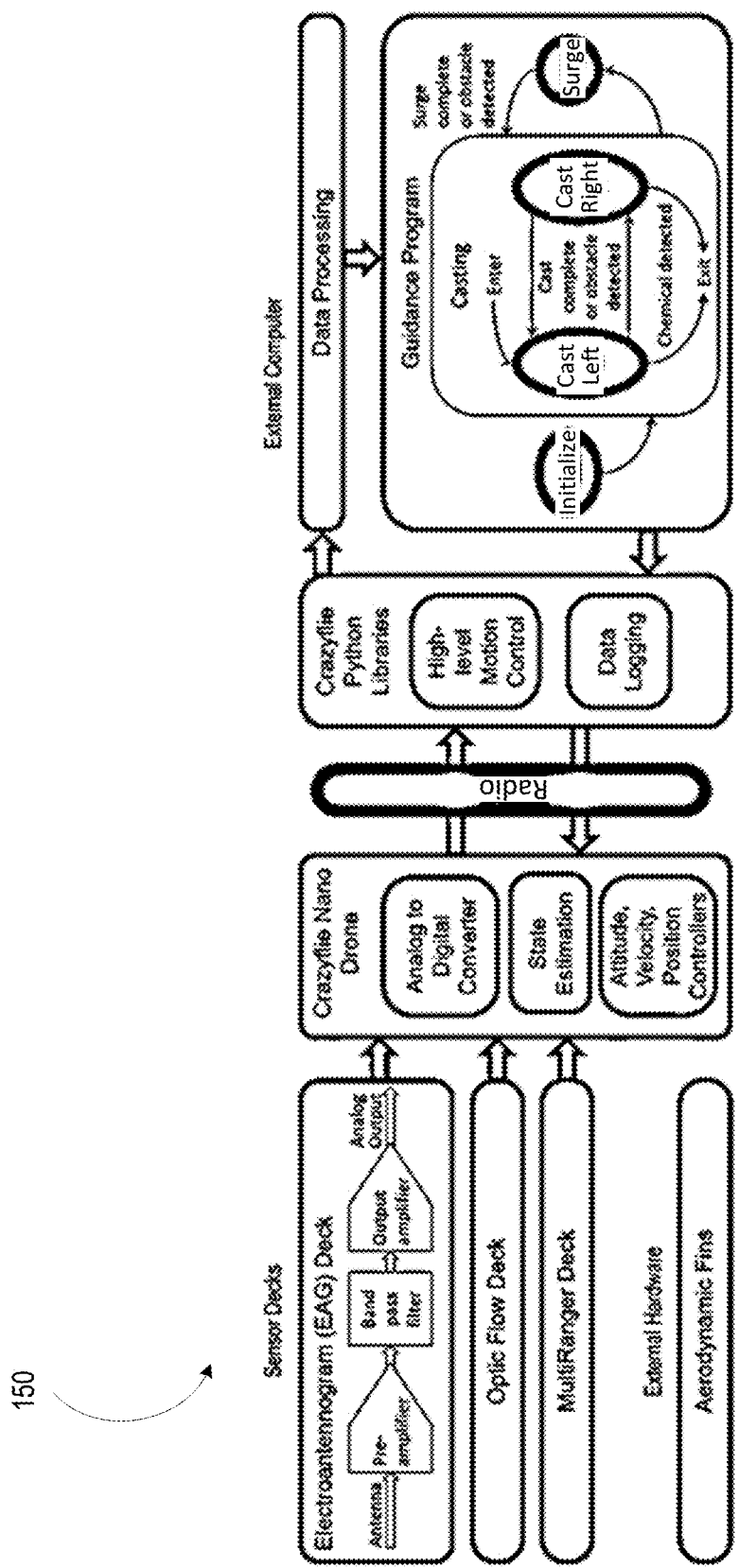
FIG. 1D is a functional block diagram of a control system (system architecture) 150 of the Smellicopter of FIG. 1A, according to one or more embodiments.

Results—Structure and Control Architecture:

Turning to the Drawings, FIG. 1A depicts a bio-hybrid odor-guided autonomous palm-sized air vehicle ("Smellicopter") 100, according to one or more embodiments. FIG. 1B depicts a detailed view of an antenna signal amplifier deck 102 of the Smellicopter 100 (FIG. 1A) that includes biological sensor 104 taken from the head of a *Manduca sexta* moth 110. FIG. 1C depicts a three-dimensional disassembled view of the Smellicopter 100, according to one or more embodiments. FIG. 1D is a functional block diagram of a control system (system architecture) 150 of the Smellicopter 100 (FIG. 1A), according to one or more embodiments.

Our palm-sized air vehicle, the Smellicopter 100 (FIG. 1A), is built from a commercially available quadcopter, the Crazyflie 2.0 (Bitcraze AB). We use two additional commercial sensor decks that have functions critical for autonomy: the Flow Deck (Bitcraze AB) which has down-facing optical-flow and range sensors and the Multi-Ranger Deck (Bitcraze AB) which has five-directional range sensing. The optical-flow sensor provides body-frame velocity measurements that allow the quadcopter to hover in-place indoors without GPS or a motion capture camera system. The laser range sensors provide range measurements in four directions in the horizontal plane (forward, back, left, right), allowing the quadcopter to detect and navigate around obstacles. In addition to the commercial components, we have added two custom innovations: Our Antennal Signal Amplifier Deck (ASAD) (FIG. 1B) and the aerodynamic fins. The ASAD generates an electroantennogram (EAG)

providing the Smellicopter with odor information. The aerodynamic fins passively steer the platform upwind to perform the odor localization algorithm. The component configuration is shown in FIG. 1C.

The Crazyflie, built from extensible open-hardware, occupies just 85 cm2 and weighs only 23 g, placing it among the smallest autonomous air vehicles on the market and making it ideal for indoor use. When carrying the additional components, the Crazyflie can fly for up to seven minutes from a single cell lithium-polymer battery with 250 mAh of capacity.

Our platform communicates over a 1 Mbyte/s Bluetooth radio link, receiving EAG data, range information, and state information from the Crazyflie, which is provided to a navigation program (FIG. 1d). This program then uses the radio to send velocity commands back to the Crazyflie. Like Luo et al. [12], we used an external computer to run the simple navigation program. However, our program has minimal computational requirements and can be fully implemented within the 32-bit microcontroller on the Crazyflie. In this work we use an external computer solely to simplify the workflow of implementing and testing the navigation program.

On-board electroantennograms (EAGs). Antennae serve as critical sensory organs for insects and other arthropods. In addition to their capacity to sense wind [21] and vibrations [22], antennae most notably provide olfactory information to the insect to find food and mates [23]. Chemical sensing follows from a complex cascade of molecular interactions [16]. Volatile compounds diffuse into the interior of the antenna where they then bind to odor-binding proteins. Those complexes then bind to, and activate, G-protein receptor molecules on the membranes of chemosensory neurons populating the interior of the antenna. Once activated, G-protein-mediated pathways provide a whole cell response that greatly amplifies the influence of a single odorant molecule. That amplified response yields, in turn, an action potential that propagates down the antennal neuron to the brain of the insect. With thousands of olfactory neurons in an antenna [24], an electroantennogram (EAG) represents their aggregate electrical activity by the voltage drop across the length of the antenna. An EAG therefore provides an electrical reading of a neural process, much as is done for electromyograms (EMG) or electroencephalograms (EEG).

The ASAD circuit, which produces the EAG, consists of three cascaded filtering and amplification stages that are tuned to the responses in antennae from *Manduca sexta*, resulting in a low-noise, highly amplified EAG signal. The ASAD weighs 1.5 g and consumes only 2.7 mW, imposing minimal weight and power requirements on the platform [25].

Materials and Methods: Chemical source composition. The composition of this mixture is shown in Table I and is similar to previously published synthetic floral scent mixtures (4).

TABLE I

Chemical composition of floral scent.

| Compound | Concentration (mL) |
| --- | --- |
| Benzaldehyde | 0.02 |
| Benzyl Alcohol | 0.5 |
| Geraniol | 2.0 |
| Linalool | 0.05 |
| Mineral Oil (dilutant) | 2.5 |

Antennae isolated from cold anesthetized *Manduca sexta* moths were connected to the ASAD via 75 μm diameter stainless steel electrodes. This preparation results in an EAG that responds to particular volatile chemicals rapidly, with a maximum bandwidth of 10 Hz [11], providing the capability to make multiple chemical detections in quick succession. We validated the EAG sensor by stimulating the antenna with a custom floral mixture of compounds present in the flower *Datura wrightii* [26], a common floral nectar source for *Manduca sexta*. The concentrations of this mixture are shown in TABLE 1. This mixture is an attractant for both female and male moths and is effective in producing EAG responses. These antennae continued to produce signals for up to four hours. The signal strength, however, continuously declines over this period as has been noted in other insect species [27].

Figure 2A:
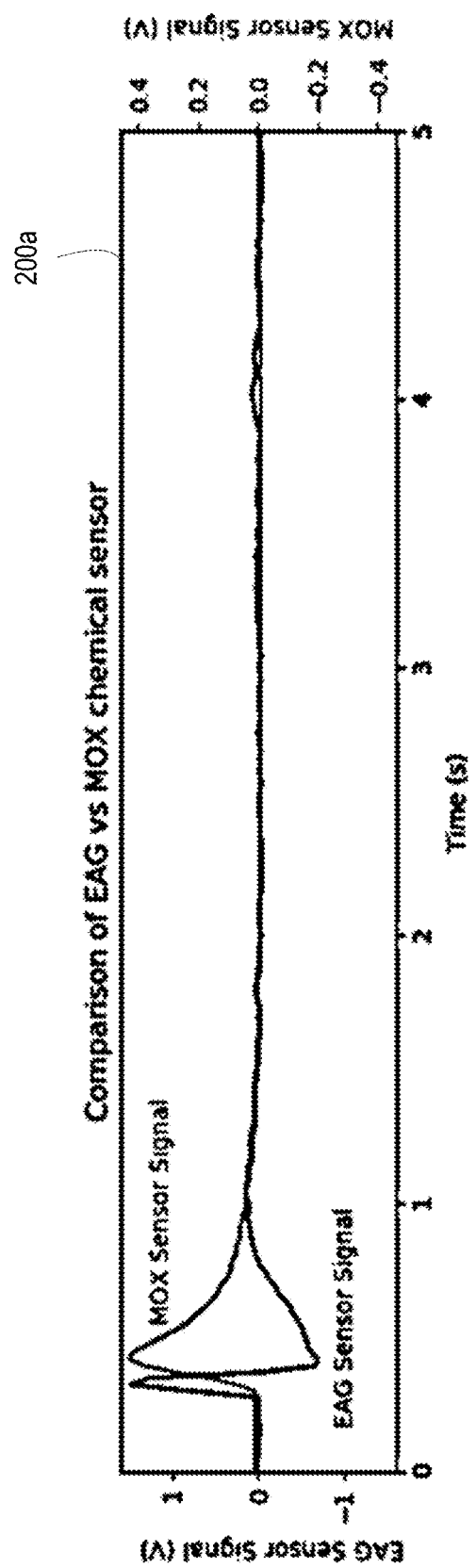
FIG. 2A is a graphical plot of electroantennograms from a moth antenna and signals from metal oxide sensors in response to stimulus delivered once, according to one or more embodiments.
Figure 2B:
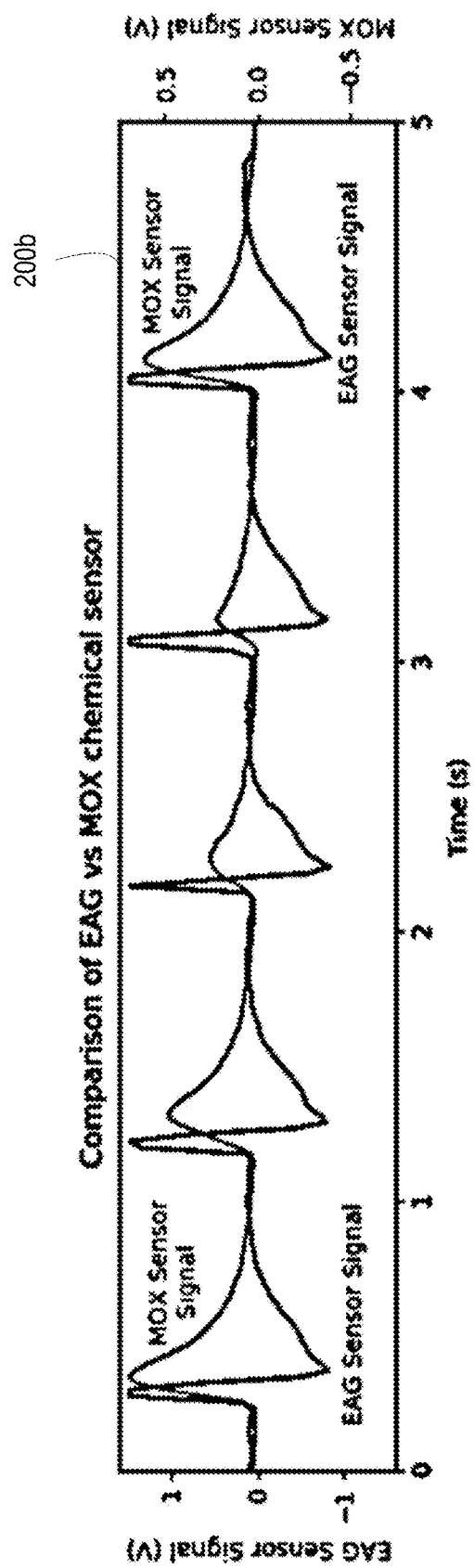
FIG. 2B is a graphical plot of electroantennograms from a moth antenna and signals from metal oxide sensors in response to stimulus delivered at approximately 1 Hz, according to one or more embodiments.
Figure 2C:
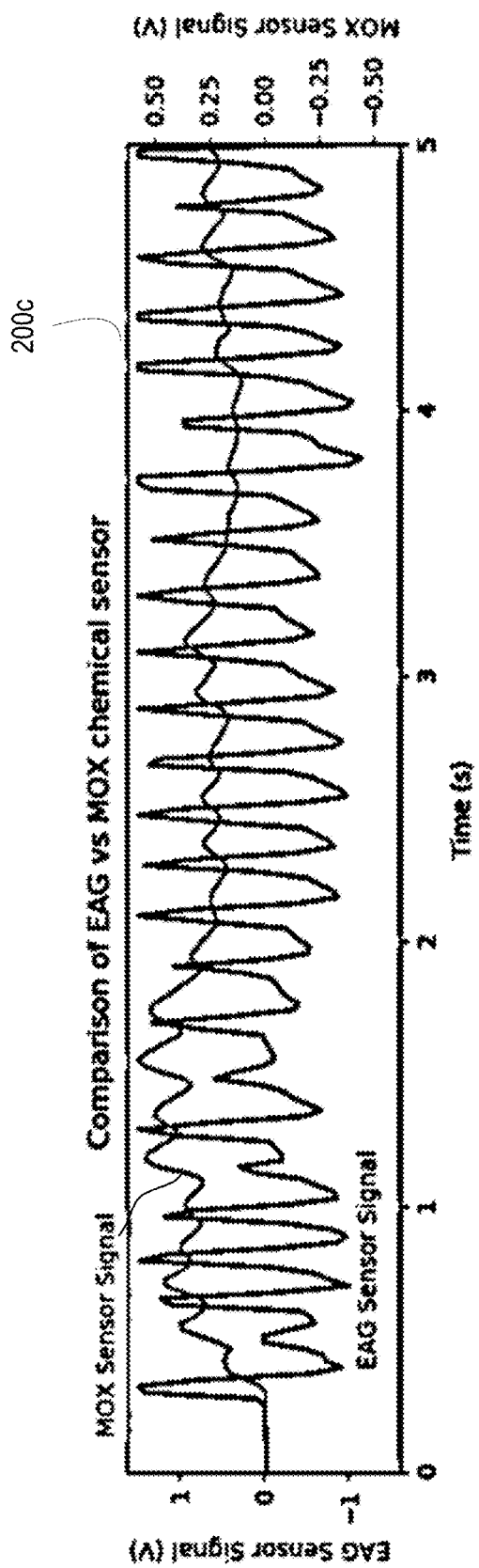
FIG. 2C is a graphical plot of electroantennograms from a moth antenna and signals from metal oxide sensors in response to stimulus delivered at approximately 5 Hz, according to one or more embodiments.

FIGS. 2A-2C are graphical plots 200a-200c of electroantennograms from a moth antenna and signals from metal oxide sensors. Three trials show the time course of signals recorded from the EAG sensor and the MOX sensor when stimulated with scented air. 5 μL of floral scent (TABLE 1) and 10 μL of 50% ethanol is deposited on a 1 cm diameter filter paper disk and placed into a disposable pipette. The stimulus is hand puffed perpendicular to the intake of an OMEGA mini wind tunnel with windspeed at 2.5 m/s. In (a), the stimulus is delivered once. In (b and c), the stimulus was delivered by hand at approximately 1 and 5 Hz with the aid of a metronome. Data were recorded at approximately 42 samples per second.

TABLE 2

EAG vs MOX comparison. Signal rise time is the time from 10% of peak to peak, signal fall time is the time from peak to 10% of peak.

| | | Peak height | Rise time | Fall time |
| --- | --- | --- | --- | --- |
| EAG | Mean | 1.425 | 0.045 | 0.045 |
| | Standard deviation | 0.098 | 0.015 | 0.007 |
| MOX | Mean | 0.466 | 0.125 | 0.533 |
| | Standard deviation | 0.180 | 0.022 | 0.023 |

We compared the sensitivity and response of the EAG produced by our sensor to a commercial metal oxide (MOX) sensor similar to those used in similar studies [12] (FIG. 2). Our EAG sensor and a metal oxide (MiCS-5524) sensor were tested simultaneously with floral scent and ethanol. Twice as much stimulus (ethanol) is used for the MOX sensor as is used for the EAG sensor (floral scent) to produce a visible signal from the MOX sensor. The EAG signal rise time (time from 10% of peak to peak) is less than half of the MOX signal rise time and the EAG signal fall time (time from peak to 10% of peak) is less than a tenth of the MOX signal (TABLE 2).

Cast-and-Surge Localization with Passive Fins.

Figure 3A:
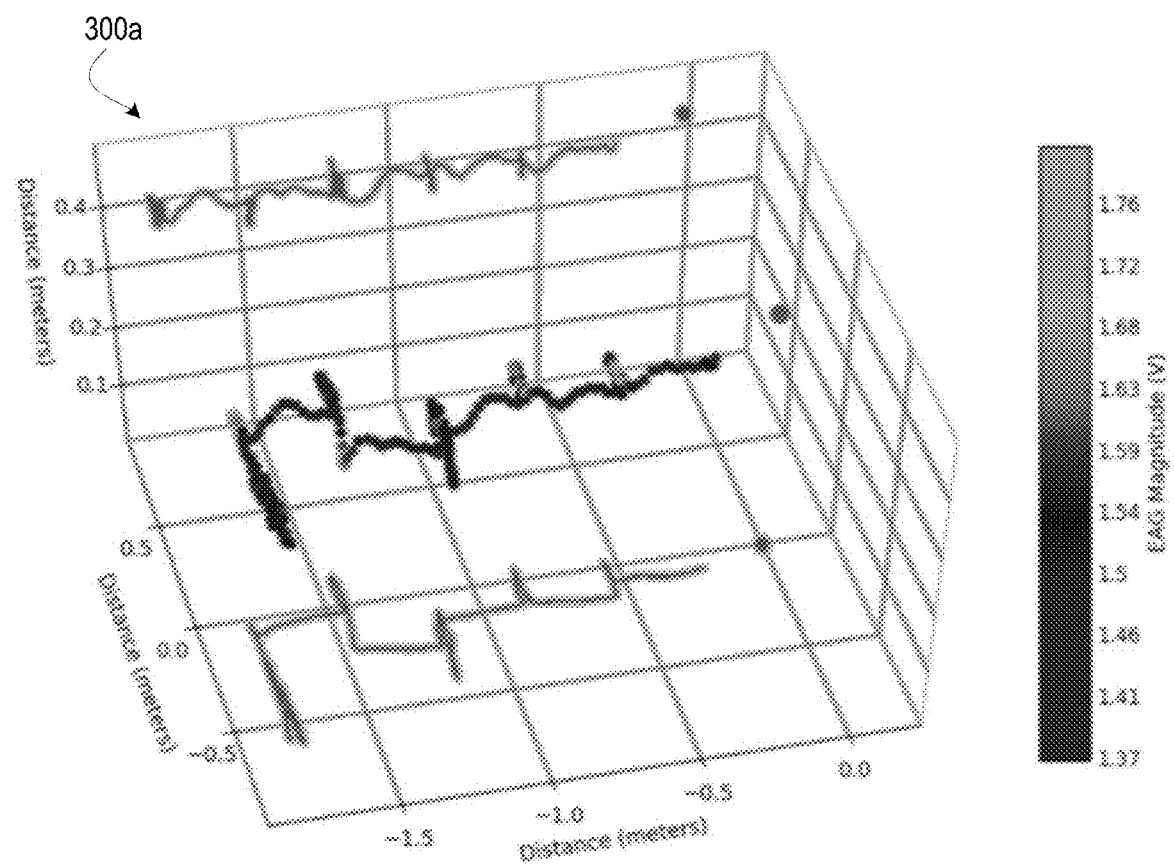
FIG. 3A is a three dimensional graphical plot of an odor localization trial annotated with antenna activity, according to one or more embodiments.
Figure 3B:
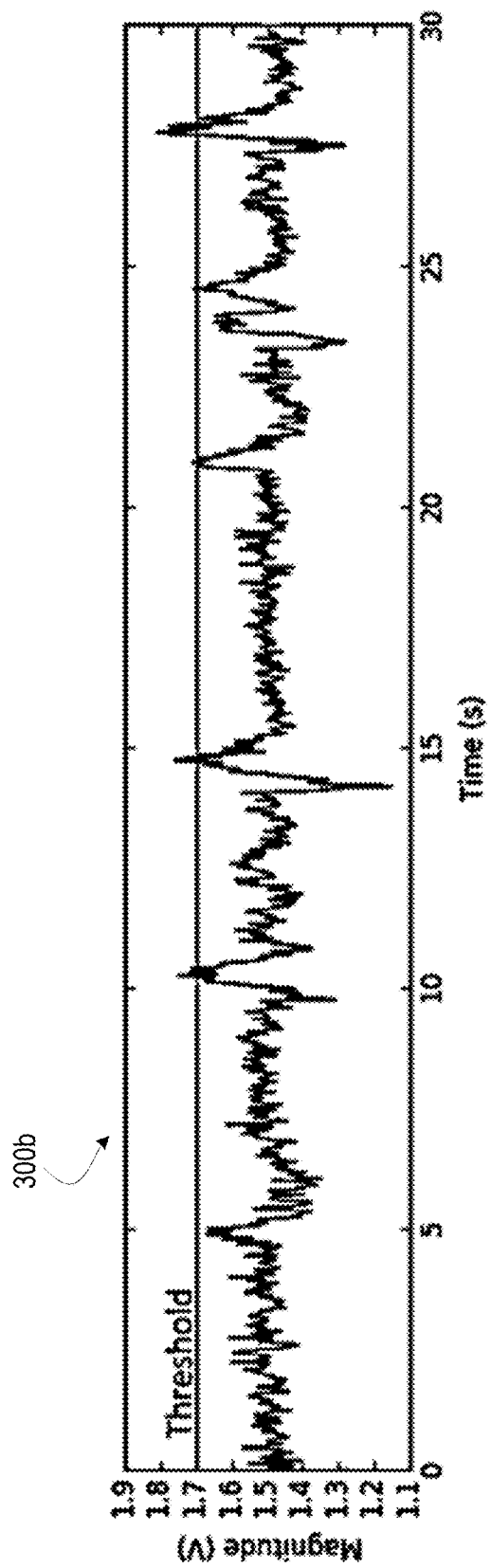
FIG. 3B is a graphical plot of electroantennograms (EAG) detected during the odor location trial of FIG. 3A, according to one or more embodiments.
Figure 3C:
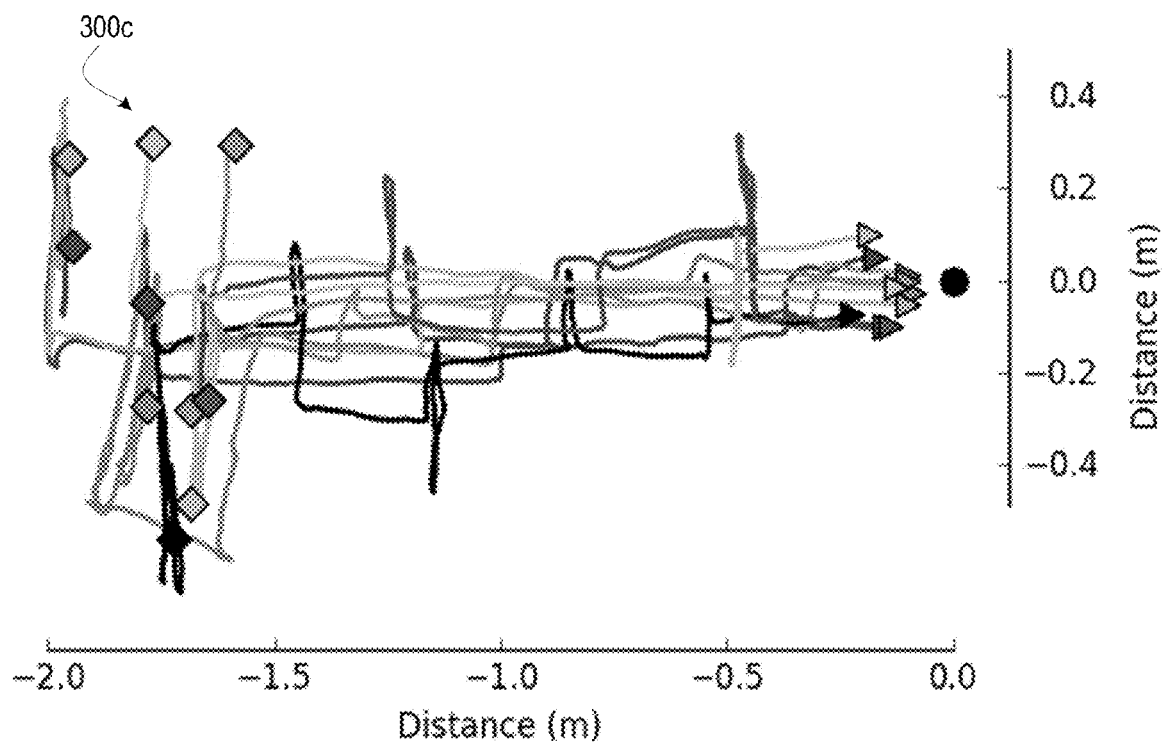
FIG. 3C is a top graphical plot of odor localization trials having a duration of less than 30 s, according to one or more embodiments.
Figure 3D:
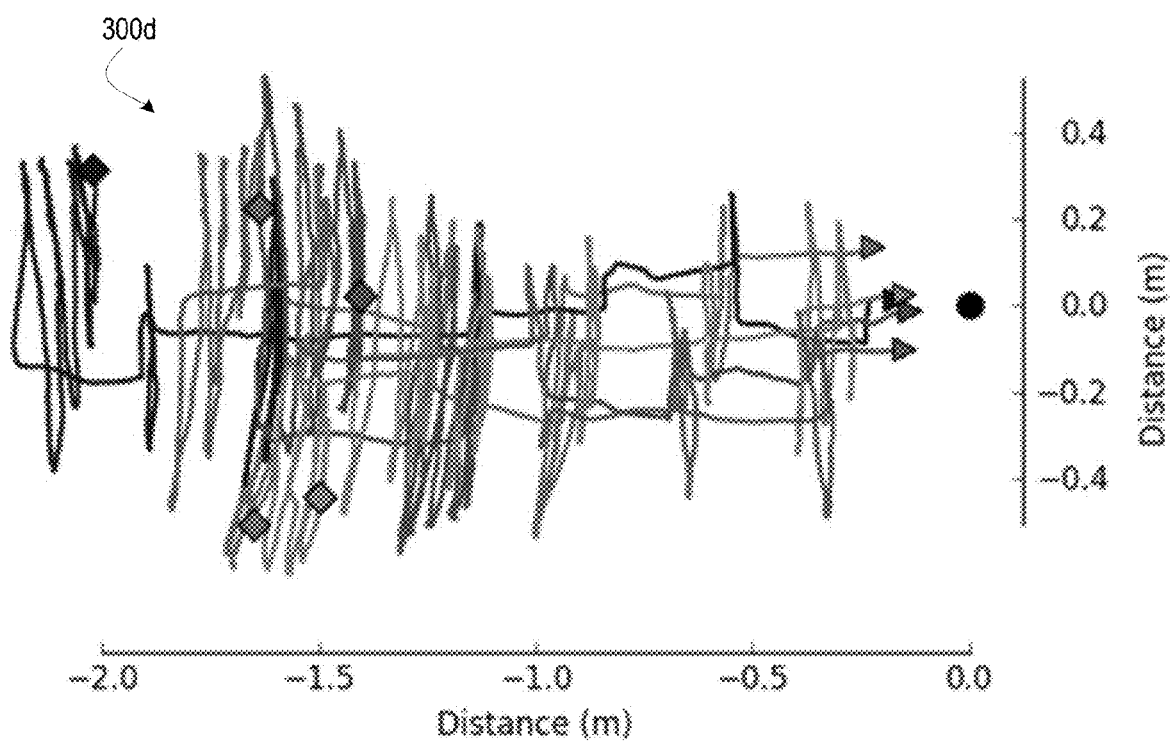
FIG. 3D is a top graphical plot of odor localization trials having a duration of more than 30 s, according to one or more embodiments.

FIGS. 3A-3D depict graphical plots 300a-300d respectively of odor localization trials. (a) A single trial of the Smellicopter navigating to the source of the odor plume. Wind speed was estimated to be approximately 1 m/s. With reference to FIG. 3A, the multicolored line of graphical plot 300a shows the 3D trajectory of the Smellicopter as estimated from its optic flow-based position estimator. Grey lines show the vertical and horizontal projections of the 3D trajectory and grey circles show the location of the source relative to each path. The color bar indicates the activity of the antenna as the trial progresses where blue is no activity, light blue is some activity, and green is large activity which triggers a surge in the behavior. The test is performed in a wind tunnel with the wind direction from right to left. The Smellicopter's position is estimated from the optical flow data and verified using ground-based video. FIG. 3B is the graphical plot 300b of electroantennogram (EAG) signal detected during the odor location trial of FIG. 3A. Activity that surpasses the threshold triggers a surge in the search strategy. (c and d) Additional tests in a top-down view. FIG. 3C is top view graphical plots 300c of trials with a duration of less than 30 s. FIG. 3D is top view graphical plots 300d of trials with a duration of greater than 30 s.

Dubbed the 'Smellicopter', our air vehicle implements an olfactory search using a navigation algorithm that is inspired by the insect foraging in a single horizontal plane [10] (see supplemental video). Flying odor-tracking insects will often fly in a crosswind casting pattern, and upon encountering an odor, the insect will steer into the wind [23]. This crosswind casting can be in the form of spiraling [11] [27], zigzagging [27] [28], or simple back-and-forth crosswind movement with no upwind component [28]. Although insects perform three-dimensional tracking while following odor plumes, 3D algorithms have not yet been implemented on flying platforms. Luo [12] does locate a source in 3D but uses a multi-stage approach which consists of a separate vertical search algorithm to find the altitude of a turbulent plume and then switches to a horizontal only search algorithm to locate the source. Our implementation (FIG. 1d) uses a crosswind casting strategy, and it requires that the Smellicopter is in an environment with relatively consistent wind or airflow. We chose to focus on deploying a two-dimensional (2D) cast-and-surge algorithm, which is similar to existing strategies that have been extensively tested in the literature.

Cross-wind casting demands that the system has wind orientation capabilities. Past efforts to perform olfactory search using autonomous UAVs have used numerical methods to actively estimate the wind vector. Neumann et al. [10] used the law of cosines to compute the wind vector from the wind triangle, but that approach required an airspeed reference function that was derived from wind tunnel characterization of the drone. Luo et al. [12] estimated the direction of the wind by filtering the UAV attitude in response to the wind, but this method requires that the wind speed imparts an attitude bias that exceeds the uncertainty of the attitude state estimate.

In contrast, we have used a passive control scheme to force the Smellicopter to constantly face upwind by adding thin plastic wind vanes to the rear motor mounts and by modifying its yaw controller. The yaw angle controller of the Smellicopter is disabled, and the gain of the yaw rate controller is reduced, which allows exogenous torque disturbances to perturb the Smellicopter's yaw angle. The wind vanes are oriented such that when the Smellicopter is not facing upwind, the force of the wind airflow on the vanes imparts a yaw torque to rotate it into the wind. This process works much like a weather vane. The Smellicopter holds its translational position using the downward-looking optic flow sensor.

Results of the odor localization trials. Detailed results of the odor localization trials are shown in TABLE 3.

TABLE 3

| Trial | Starting position x (m) | Starting position y (m) | Ending distance to source (cm) | Time duration (s) | Length of total path (m) |
|---|---|---|---|---|---|
| 1 | −1.95 | 0.07 | −4.0 | 23.91 | 4.27 |
| 2 | −1.65 | −0.51 | 5.5 | 73.14 | 8.12 |

TABLE 3-continued

| Trial | Starting position x (m) | Starting position y (m) | Ending distance to source (cm) | Time duration (s) | Length of total path (m) |
|---|---|---|---|---|---|
| 3 | −1.78 | −0.05 | 2.0 | 12.40 | 2.27 |
| 4 | −2.02 | 0.31 | 0.5 | 79.63 | 14.27 |
| 5 | −1.78 | −0.27 | −1.0 | 45.78 | 5.36 |
| 6 | −1.41 | 0.02 | −0.5 | 85.32 | 15.60 |
| 7 | −1.96 | 0.27 | −2.0 | 17.95 | 3.33 |
| 8 | −1.50 | −0.44 | 1.0 | 93.12 | 16.98 |
| 9 | −1.68 | −0.28 | 0.5 | 12.44 | 2.24 |
| 10 | −1.72 | −0.56 | −3.0 | 29.88 | 5.28 |
| 11 | −1.64 | 0.22 | −4.0 | 100.47 | 11.33 |
| 12 | −1.68 | −0.48 | 4.0 | 22.03 | 3.86 |
| 13 | −1.59 | 0.30 | 0.0 | 15.90 | 2.14 |
| 14 | −1.65 | −0.26 | −4.0 | 28.01 | 3.11 |
| 15 | −1.77 | 0.30 | −0.5 | 11.16 | 2.07 |

For our 2D cast-and-surge tests, the Smellicopter takes off to a height of 40 cm and then hovers while the yaw control is lowered to allow passive upwind orientation using the aerodynamic fins. It then begins left-right crosswind casting with increasing casting amplitude until a volatile chemical is detected via the ASAD, at which time it will surge 25 cm upwind (i.e. forward). In the absence of additional chemical signals, it resumes crosswind casting. The tests are automatically terminated once it is approximately 10 cm downwind of the source to avoid the Smellicopter colliding with the intake screen of the wind tunnel. Volatile chemicals are detected by simple thresholding of the EAG signal. Prior to the trials, the Smellicopter is manually hovered in and out of the chemical plume in order to manually determine the threshold. If the EAG signal exceeds this threshold during flight, a surge is triggered. This strategy will bring the insect or robot increasingly closer to an odor source with each surge. Moreover, the casting allows the insect or robot to relocate the plume even if there is a slight shift in the wind direction or movement of the source; however, the algorithm requires that the Smellicopter is facing upwind most of the time. In 14 out of 15 trials, the Smellicopter ended within 4 cm of the source in the crosswind direction (FIG. 3) (TABLE 3). All trials ended within 6 cm of the source in the crosswind direction. Distance to the source in the direction parallel to the wind direction is not recorded since the trials are stopped before the Smellicopter collides with the intake screen of the wind tunnel.

Multisensor Integration with Obstacle Avoidance.

Figure 4A:
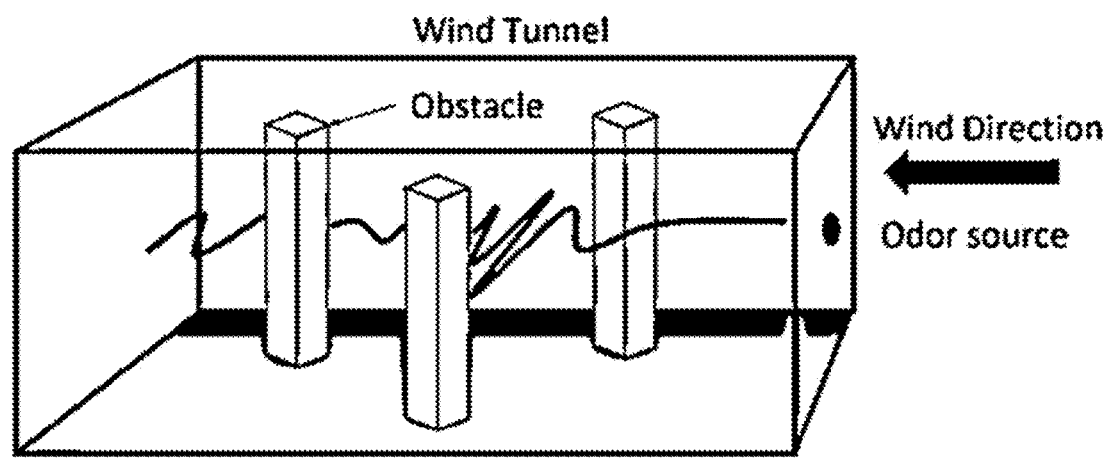
FIG. 4A is a three-dimensional diagrammatic view of an environment for obstacle avoidance trials.

FIG. 4A is a three-dimensional diagrammatic view of an environment for obstacle avoidance trials. The wind speed is set at approximately 1 m/s. (FIGS. 4B-4C) Individual obstacle avoidance trials. The blue and green line is trajectory, where blue portions indicate no odor detected, light blue portions indicate increased activity within the EAG signal, and green portions indicate high activity triggering a surge. Grey diamonds are video estimated locations of obstacles. Orange x's indicated range measurements made by the Smellicopter as it is flying past the obstacles. Black circles are source locations estimated by video.

Figure 4B:
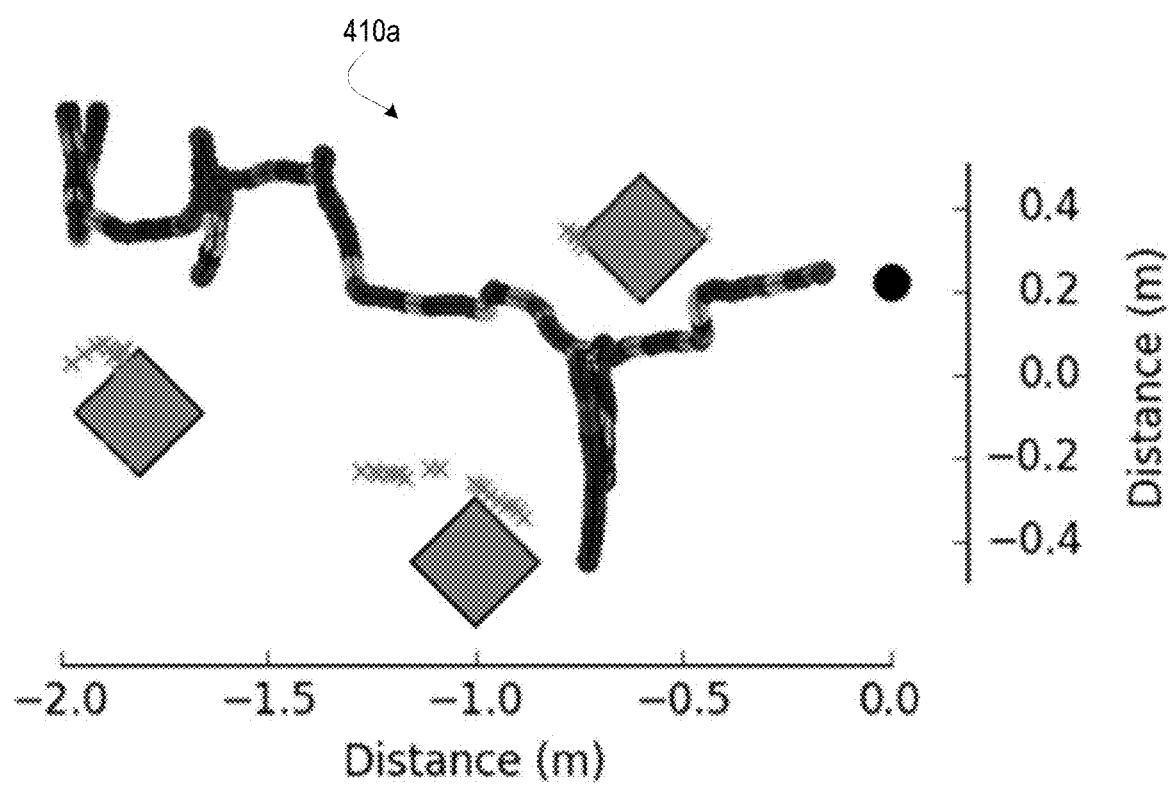
FIGS. 4B-4C depict graphical views of two successful trials of the Smellicopter performing odor localization as well as obstacle avoidance.
Figure 4C:
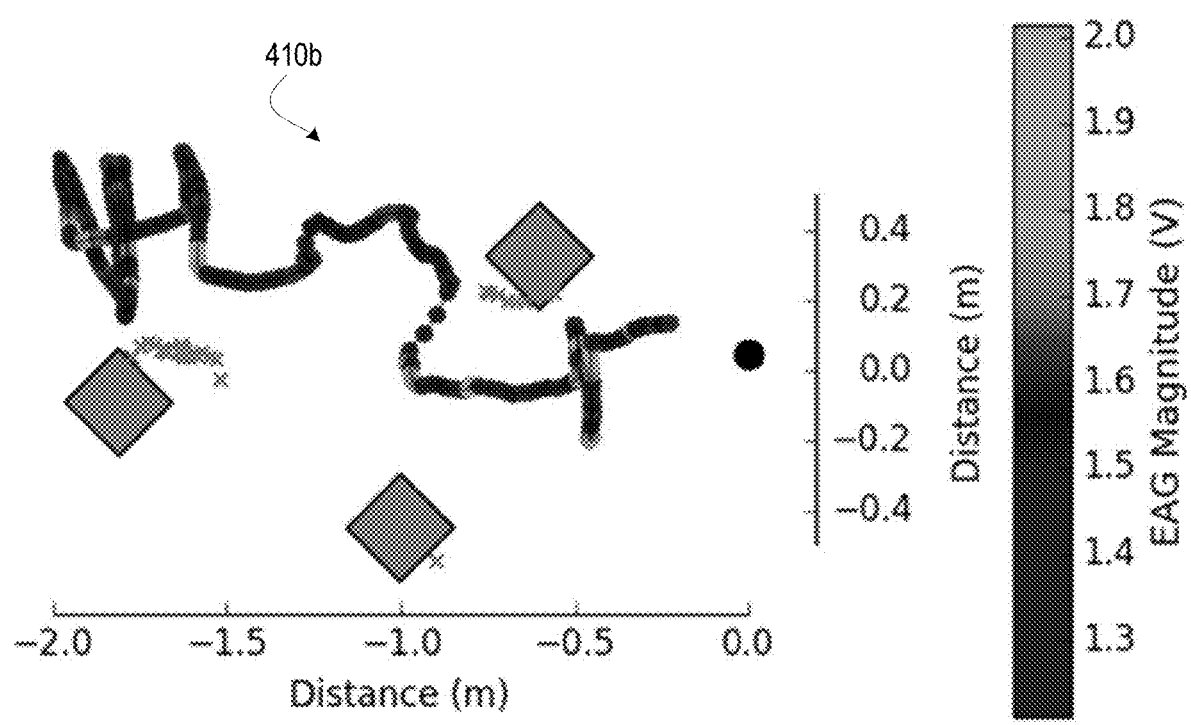

The Smellicopter is equipped with a MultiRanger Deck that uses four infrared range sensors that permit obstacle detection and thus allows it to navigate around obstacles while performing an odor localization strategy. The fifth range sensor which gives a distance measurement to obstacles above the Smellicopter is unused. To avoid obstacles, the Smellicopter takes range measurements in four directions, ten times per second. When a range measurement in the direction of the Smellcopter's current heading falls below 20 cm, then the Smellicopter will change direction by advancing to the next state of the cast-and-surge search behavior. To test the obstacle avoidance capability of our platform, we set up cardboard obstacles inside the wind tunnel environment outlined in the previous experiments (FIG. 4A). The wind speed is set to approximately 1 m/s and the source is a 2 cm filter paper disk with 5 µL on custom scent mixture deposited on it. Trials are manually terminated when the Smellicopter comes within approximately 10 cm of the source in the direction parallel to the wind direction to prevent collision with the front on the wind tunnel. Using this strategy, the Smellicopter is able to successfully localize the source of the odor while avoiding the obstacles presented. FIGS. 4B-4C depict top graphical views 410*a*, 410*b* respectively of two successful trials of the Smellicopter performing odor localization as well as obstacle avoidance. In each trial, the Smellicopter navigates through the obstacles and ends within 4 cm of the source in the cross-wind direction.

Discussion

This study has drawn on the synergy between the engineerability of synthetic robotics and the outstanding performance of naturally-occurring sensory systems to create a device that combines the best of both worlds. Thus, we developed a biohybrid flight system capable of autonomously localizing a chemical source via a biologically-inspired plume tracking behavior. It provides a novel solution to a challenging technological problem; one with stringent size, weight and power (SWaP) constraints. Interestingly, the development of bio-hybrid robotic systems has seen dramatic growth over the last decade, with some systems containing microelectronics embedded into intact living systems [29] [30] [31] [32], devices that contain sensory structures embedded onto robotic platforms [17] [19] [33], and even robotic platforms with integrated cultured muscle cells as actuators [4]. All these efforts seek to take advantage of the sensor or actuator efficiency of living systems along with the fabrication advantages of artificial systems.

While the integration of natural and synthetic systems presents exciting new horizons for autonomous aerial vehicles, operating under stringent SWaP constraints poses both challenges and opportunities. Indeed, our motivation to turn to natural sensory structures was largely motivated by these constraints. Using the living antennae of moths with electronic amplifiers to generate electroantennograms is a weight and power efficient way to acquire chemical information, but antennae have a finite lifetime, thus limiting their long-term deployment. That said, the battery life of the Crazyflie is significantly shorter than the longevity of antennae providing EAGs. Typical flight times are constrained to be less than about 10 min for the Crazyflie and our associated additional hardware. In contrast, we were able to maintain stable EAGs for more than two hours. Additionally, explanted antennae can be stored on ice for several days prior to deployment on the Smellicopter, suggesting a viable strategy for deployment in locations remote from a laboratory.

Insect antennae respond to hundreds of volatiles [34] [35] [36] [24], providing both a challenge and an opportunity. Our current configuration can function well with any number of volatile cures, but specific responses to a single odorant is challenging if multiple volatiles are present in the plume. Emerging CRISPR technologies, however, may allow gene editing of antennae to target specific volatiles [20]. Future efforts can focus on multiple antennae, each designed for a specific volatile, thus providing detection of more complex chemical signals.

Other limitations related to SWaP constraints include our method for collision avoidance. The current configuration using four side-facing laser range sensors is a lightweight solution to avoid collisions, but works poorly under conditions where the sensor view is tangential to the object or is small enough to fit between the detection beams. This limitation could be addressed with ultra-miniature camera systems, but would require significant processing for detecting close objects against a visual background and estimating their distance, an approach that could easily exceed the available computational or power resources for small autonomous air vehicles.

Despite these limitations, our biohybrid system holds promise for many applications in which we have used other odor localization solutions, notably the myriad situations in which used dogs have been used to detect and locate drugs, missing people, or volatiles from explosives. Moreover, this aerial robotic system can provide a valuable platform on which we can experimentally explore the complex 3-D interaction between aerial propulsion, odor localization strategies, and airflow in the environment.

Experimental setup for comparison between MOX sensor and EAG sensor. We deposited 5 µL of the scent mixture and 10 µL of 50% ethanol on a 1 cm diameter filter paper placed inside of a disposable pipette. When the pipette is squeezed it expels a puff of floral and ethanol scented air. The EAG and MOX sensors were placed adjacent to one another inside of an OMEGA mini wind tunnel with airspeed at 2.5 m/s. The pipette is placed perpendicular to the air flow at the intake of the wind tunnel to ensure that the antennal response recorded is due to chemical stimulus and not to mechanical stimulus from the puffed air. The pipette is puffed by hand at various frequencies. Each stimulus results in an obvious spike in the output signal that decays in a fraction of a second. We quantified the rise and fall times by computing the time between 10 percent of the peak value to the time of the peak value and from the time of the peak value to 10 percent of the peak value respectively.

Experimental setup for odor localization and obstacle avoidance trials. For the odor localization and obstacle avoidance trials, the source is a 2 cm filter paper disk with 5 µL of the scent mixture deposited on it. The trials take place in a 2 m long by 1 m wide, by 1 m tall wind tunnel with a windspeed of approximately 1 m/s. The source is placed at the front of the wind tunnel, upwind of the experimental area.

Figure 5:
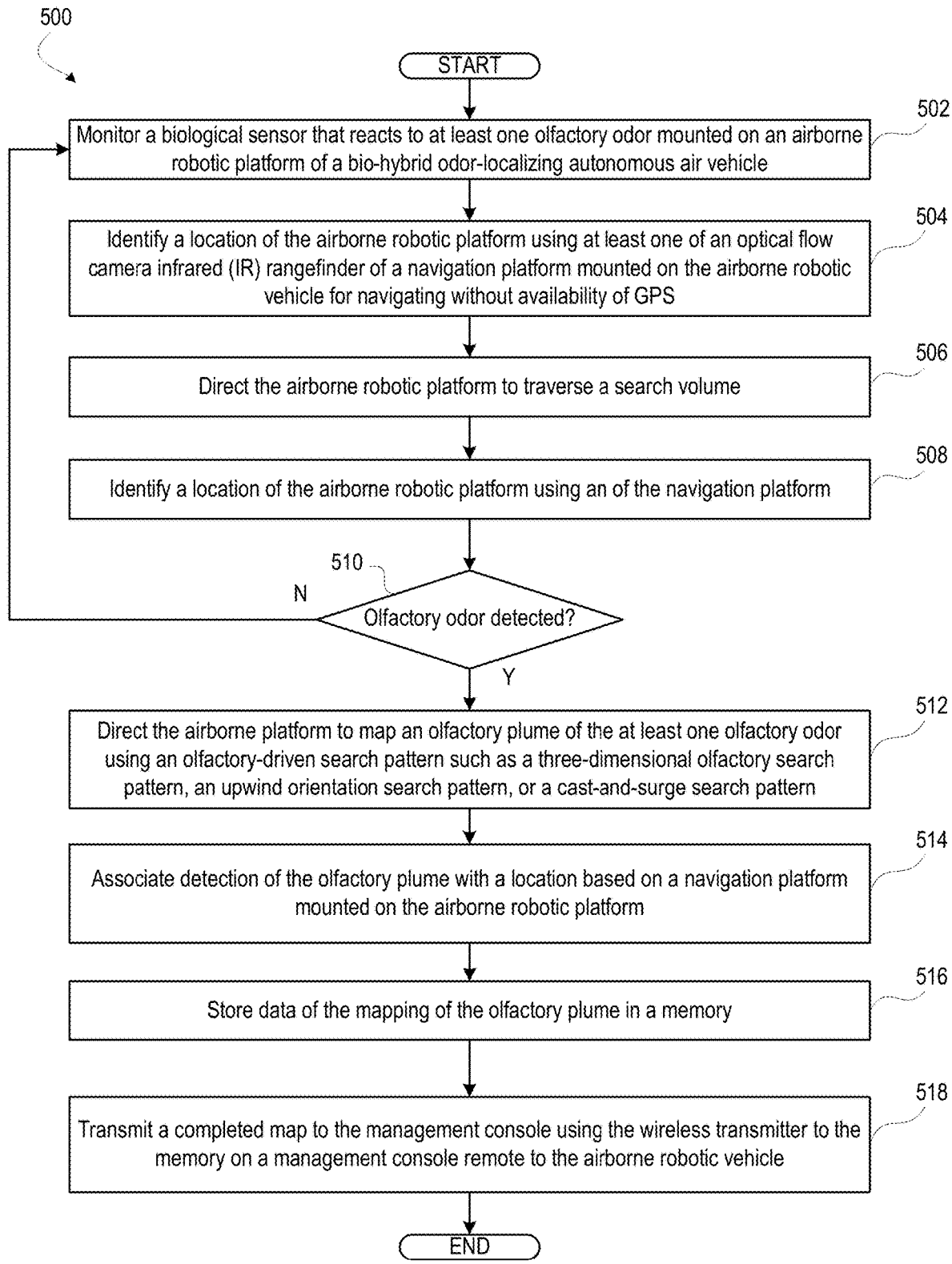
FIG. 5 depicts a flow diagram of a method for mapping an olfactory plume using a biological sensor mounted on an airborne robotic platform, according to one or more embodiments.

FIG. 5 depicts a flow diagram of a method 500 for mapping an olfactory plume using a biological sensor mounted on an airborne robotic platform, according to one or more embodiments. Method 500 includes monitoring a biological sensor that reacts to at least one olfactory odor mounted on an airborne robotic platform of a bio-hybrid odor-localizing autonomous air vehicle (block 502). Method 500 includes identifying a location of the airborne robotic platform using at least one of an optical flow camera infrared (IR) rangefinder of a navigation platform mounted on the airborne robotic vehicle for navigating without availability of GPS (block 504). Method 500 includes directing the airborne robotic platform to traverse a search volume (block 506). Method 500 includes identifying a location of the airborne robotic platform using an of the navigation platform (block 508). A determination is made, in decision block 510, whether the at least one olfactory odor is detected. In response to the biological sensor not detecting the at least one olfactory odor, method 500 returns to block 502. In response to the biological sensor detecting the at least one olfactory odor, method 500 includes directing the airborne platform to map an olfactory plume of the at least one olfactory odor using an olfactory-driven search pattern such as a three-dimensional olfactory search pattern, an upwind orientation search pattern, or a cast-and-surge search pattern (block 512). Method 500 includes associating detection of the olfactory plume with a location based on a navigation platform mounted on the airborne robotic platform (block 514). Method 500 includes storing data of the mapping of the olfactory plume in a memory (block 516). Method 500 includes transmitting a completed map to the management console using the wireless transmitter to a management console remote to the airborne robotic vehicle (block 518). Then method 500 ends.

According to aspects of the present disclosure, an unmanned aerial vehicle (UAV) detects a chemical gas by olfactory search by comprising: (a) a robotic platform having a navigation program; (b) a chemical sensor for detecting one or more chemical gases; and (c) an olfactory search capability for locating the one or more chemical gases.

The UAV includes a robotic platform. In certain embodiments, the robotic platform is an autonomous nanodrone. In certain of these embodiments, the nanodrone includes aerodynamic fins (wind vanes) and yaw control authority. The aerodynamic fins and yaw control authority passively orient the UAV upwind during flight. In certain embodiments, the robotic platform further comprises an optical flow camera and infrared laser range finder for providing velocity measurements to the UAV. In other embodiments, the robotic platform further comprises a Bluetooth radio transceiver and USB radio dongle having a python driver library to provide access to vehicle telemetry and control from an external computer.

The UAV includes a chemical sensor. In certain embodiments, the chemical sensor of the UAV described above includes an electroantennogram (EAG) on an excised insect antenna. In certain embodiments, the electroantennogram is connected to the antenna by inserting a wire (e.g., 75 um diameter stainless steel) into each end of the insect antenna. In certain embodiments, the insect antenna is a moth antenna (e.g., the antenna of *Manduca sexta* hawkmoth). In these embodiments, the electroantennogram is an analog circuit that measures the response of the insect antenna to chemical or mechanical stimuli. The electroantennogram measures the aggregate electrical activity of the olfactory neurons in the insect antenna by measuring the voltage drop across the insect antenna and filters the signal for measurement by an analog to digital converter. In certain embodiments, the electroantennogram includes a high gain amplifier, an active bandpass filter (e.g., 4th order), and an output amplifier. In certain embodiments, the electroantennogram is tuned to the insect antenna characteristics to provide a low noise and high amplitude output signal. In certain embodiments, the insect antenna is a genetically modified antenna. As used herein the term "genetically modified antenna" refers to an antenna of an insect that has been genetically modified such that the antenna has the capability of sensing select (predetermined) chemicals (e.g., chemical gases of interest). In certain embodiments, the genetically modified antenna is the result of gene editing by, for example, the gene editing tool CRISPR. The genetically modified antenna can be modified to so as to provide an antenna that is sensitive to chemicals that are other than those naturally sensed by the antenna. The antenna can be modified to sense multiple select chemicals.

In one or more embodiments, the robotic platform is an autonomous nanodrone. In one or more particular embodiments, the nanodrone comprises aerodynamic fins and yaw control authority. In one or more specific embodiments, the aerodynamic fins and yaw control authority passively orient the UAV upwind during flight. In one or more embodiments, the robotic platform further comprises an optical flow camera and infrared laser range finder for providing velocity measurements to the UAV. In one or more embodiments, the robotic platform further comprises a Bluetooth radio transceiver and USB radio dongle having a python driver library to provide access to vehicle telemetry and control from an external computer. In one or more embodiments, the chemical sensor comprises an electroantennogram (EAG) on an excised insect antenna. In one or more particular embodiments, the electroantennogram is connected to the antenna by inserting a wire into each end of the insect antenna. In one or more particular embodiments, the insect antenna is a moth antenna. In one or more particular embodiments, the electroantennogram is an analog circuit that measures the response of the insect antenna to chemical or mechanical stimuli. In one or more particular embodiments, the electroantennogram measures the aggregate electrical activity of the olfactory neurons in the insect antenna by measuring the voltage drop across the insect antenna and filters the signal for measurement by an analog to digital converter. In one or more particular embodiments, the electroantennogram comprises a high gain amplifier, an active bandpass filter, and an output amplifier. In one or more particular embodiments, the electroantennogram is tuned to the insect antenna characteristics to provide a low noise and high amplitude output signal. In one or more particular embodiments, the insect antenna is a genetically modified antenna.

The UAV has an olfactory search capability. In certain embodiments, the olfactory search capability provides is a reactive strategy. The reactive strategy can be cast-and-surge that guides the UAV upwind to the chemical gas source. The reactive strategy is crosswind casting in the form of spiraling, zigzagging, or simple crosswind back-and forth movement with no upwind component, followed by surges upwind when a chemical plume is detected by the chemical sensor.

In other aspects of the invention, methods for using the UAV are provided. The present disclosure provides the use of the UAV described herein for localizing a chemical gas sensor at the site of a chemical gas plume using feedback only from sensors on-board the UAV without the benefit of global positioning system (GPS).

In one or more embodiments, the UAV includes (a) a robotic platform having a navigation platform, (b) a chemical sensor for detecting one or more gases, and (c) olfactory search capability for locating chemical gases. The robotic platform further includes: (i) A robotic platform having a navigation platform; (ii) Operation using optical flow cameras or infrared (IR) rangefinders instead of global positioning system (GPS), enabling use in areas that do not receive GPS signals or have GPS signals that are being jammed; and (iii) Passive upwind orientation using an aerodynamic device. In one or more embodiments, the robotic platform is a very small flying drone (quadcopter). The chemical sensor for detecting one or more gases can be: (i) based on a moth antenna; or (ii) based on a biological sensor that is genetically modified to target specific gases. The olfactory search capability for locating chemical gases can include one or more of olfactory driven searches: (i) Upwind orientation search patterns; and (ii) Search pattern based on insect-like cast-and-surge algorithm.

In one or more embodiments, the sensor is based on a moth antenna. Currently, metal oxide gas sensors are most commonly used in odor source localization, but these sensors are too heavy for small drone applications. This invention teaches the use of moth antennae, which are very lightweight and very responsive to specific odors, through a multi-channel electroantennogram (EAG).

In one or more embodiments, the sensor is based on a biological sensor that is genetically modified to target specific gases. Moth antennae are typically responsive to pheromones and other animal related scents. In one or more embodiments, the UAV utilizes a moth antenna that is responsive to the odor of a particular (dangerous) gas or chemical. Genetic modification is proposed to adapt a species of moth to be sensitive to, and thereby target, specific chemicals.

In one or more embodiments, an olfactory driven search of an odor plume is found using only a single kind of olfactory sensor. Upwind orientation search patterns is when a robot searches upwind of detected odors to locate the source of the odor plume. Search pattern based on insect-like cast-and-surge algorithm uses an algorithm inspired by insect behavior with a random crosswind pattern, called casting that is employed to search the area for odor. When detected, the robotic platform automatically moves upwind in a "surge." Through successive iterations, the robot converges on the odor source.

The following references cited above are hereby incorporated by reference in their entirety:

[1] H. M. Herr and A. M. Grabowski, "Bionic ankle-foot prosthesis normalizes walking gait for persons with leg amputation," Proc. R. Soc. B., vol. 279, pp. 457-464, 2011.

[2] J. Heeron, T. Denison and H. J. Chizeck, "Closed-Loop DBS with Movement Intention," 7th International IEEE/EMBS Conference on Neural Engineering, pp. 844-847, 2015.

[3] M. W. Gander, J. D. Vrana, W. E. Voje, J. M. Carothers and E. Klavins, "Digital logic circuits in yeast with CRISPR-dCas9 NOR gates," Nature Communications, vol. 8, p. 15459, 2017.

[4] L. Ricotti, B. Trimmer, A. W. Feinberg, R. Raman, K. K. Parker, R. Bashir, M. Sitti, S. Martel, P. Dario and A. Menciassi, "Biohybrid actuators for robotics: A review of devices actuated by living cells," Science Robotics, vol. 2, no. 12, 2017.

[5] N. W. Xu and J. O. Dabiri, "Low-power microelectronics embedded in live jellyfish enhance propulsion," Science Advances, vol. 6, 2020.

[6] J. A. Riffell, L. Abrell and J. G. Hildebrand, "Physical Processes and Real-Time Chemical Measurement of the Insect Olfactory Environment," Journal of Chemical Ecology, vol. 34, no. 7, pp. 837-853, 2008.

[7] S. Anton and B. Hansson, "Sex pheromone and plant-associated odour processing in antennal lobe interneurons of male *Spodoptera littoralis* (*Lepidoptera*: Noctuidae)," Journal of Comparative Physiology A, vol. 176, no. 6, 1995.

[8] C. Lahondère, C. Vinauger, R. P. Okubo, G. H. Wolff, J. K. Chan, O. S. Akbari and J. A. Riffell, "The olfactory basis of orchid pollination by mosquitoes," PNAS, vol. 117, pp. 708-716, 2020.

[9] S. A. Budick and M. H. Dickinson, "Free-flight responses of *Drosophila melanogaster* to attractive odors," Journal of Experimental Biology, vol. 209, pp. 3001-3017, 2006.

[10] P. P. Neumann, V. H. Bennetts, A. J. Lilienthal, M. Bartholmai and J. H. Schiller, "Gas source localization with a micro-drone using bio-inspired and particle filter-based algorithms," Advanced Robotics, vol. 27, no. 9, pp. 725-738, 2013.

[11] D. Martinez, L. Arhidi, E. Demondion, J. B. Masson and P. Lucas, "Using Insect Electroantennogram Sensors on Autonomous Robots for Olfactory Searches," Journal of Visualized Experiments, no. 90, 2014.

[12] B. Luo, Q. H. Meng, J. Y. Wang and M. Zeng, "A Flying Odor Compass to Autonomously Locate the Gas Source," IEEE Transactions on Instrumentation and Measurement, pp. 1-13, 2017.

[13] J. Burgués, V. Hernández, A. J. Lilienthal and S. Marco, "Smelling Nano Aerial Vehicle for Gas Source Localization and Mapping," Sensors, vol. 19, p. 478, 2019.

[14] B. P. Duisterhof, S. Krishnan, J. J. Cruz, C. R. Banbury, W. Fu, A. Faust, G. C. H. E. de Croon and V. J. Reddi, "Learning to Seek: Deep Reinforcement Learning for Phototaxis of a Nano Drone in an Obstacle Field," arXiv, vol. 1909.11236, 2020.

[15] A. Mafra-Neto and R. T. Cardé, "Fine-scale structure of pheromone plumes modulates upwind orientation of flying moths," Nature, no. 369, pp. 142-144, 1994.

[16] M. Spehr and S. D. Munger, "Olfactory receptors: G protein-coupled receptors and beyond," Journal of Neurochemistry, vol. 109, pp. 1570-1583, 2009.

[17] Y. Kuwana, S. Nagasawa, I. Shimoyama and R. Kanzaki, "Synthesis of the pheromone-oriented behaviour of silkworm moths by a mobile robot with moth antennae as pheromone sensors," Biosensors and Bioelectronics, vol. 14, pp. 195-202, 1999.

[18] N. Ando and R. Kanzaki, "Using insects to drive mobile robots—hybrid robots bridge the gap between biological and artificial systems," Arthropod Structure & Development, vol. 46, pp. 723-735, 2017.

[19] J. V. Huang, Y. Wei and H. G. Krapp, "Active Collision Free Closed-Loop Control of a Biohybrid Fly-Robot Interface. In: Vouloutsi V. et al. (eds) Biomimetic and Biohybrid Systems," Living Machines 2018. Lecture Notes in Computer Science, vol. 10928, 2018.

[20] R. A. Fandino, A. Haverkamp, S. Bisch-Knaden, J. Zhang, S. Bucks, T. A. Nguyen, K. Schröder, A. Werckenthin, J. Rybak, M. Stengel, M. Knade, B. S. Hansson and E. Große-Wilde, "Mutagenesis of odorant coreceptor Orco fully disrupts foraging but not oviposition behaviors in the hawkmoth *Manduca sexta*," Proceedings of the National Academy of Sciences, vol. 116, pp. 15677-15685, 2019.

[21] S. B. Fuller, A. D. Straw, M. Y. Peek, R. M. Murray and M. H. Dickinson, "Flying *Drosophila* stabilize their vision-based velocity controller by sensing wind with their antennae," PNAS, vol. 111, no. 13, pp. E1182-E1191, 2014.

[22] S. P. Sane, A. Dieudonné, M. A. Willis and T. L. Daniel, "Antennal Mechanosensors Mediate Flight Control in Moths," Science, vol. 315, pp. 863-866, 2007.

[23] M. A. Willis, E. A. Ford and J. L. Avondet, "Odor tracking flight of male *Manduca sexta* moths along plumes of different cross-sectional area," Journal of Comparative Physiology A, vol. 199, no. 11, pp. 1015-1036, 2013.

[24] J. K. Lee and N. Strausfeld, "Structure, distribution and number of surface sensilla and their receptor cells on the olfactory appendage of the male moth *Manduca Sexta*," J. Neurocytology, vol. 19, pp. 519-538, 1990.

[25] M. J. Anderson, J. G. Sullivan, K. Brink, J. Talley, S. Fuller and T. Daniel, "The Smellicopter, a bio-hybrid odor localizing nano air vehicle," 2019.

[26] C. E. Reisenman, J. A. Riffell, K. Duffy, A. Pesque, D. Mikles and B. Goodwin, "Species—Specific Effects of Herbivory on the Oviposition Behavior of the Moth *Manduca sexta*," Journal of Chemical Ecology, vol. 39, no. 1, pp. 76-89, 2012.

[27] N. Voges, A. Chaffiol, P. Lucas and D. Martinez, "Reactive Searching and Infotaxis in Odor Source Localization," PLoS Computational Biology, vol. 10, no. 11, 2012.

[28] D. Harvey, T. F. Lu and M. Keller, "Comparing Insect-Inspired Chemical Plume Tracking Algorithms Using a Mobile Robot," IEEE Transactions on Robotics, vol. 24, no. 2, pp. 307-317, 2008.

[29] W. M. Tsang, A. L. Stone, D. Otten, Z. N. Aldworth, J. G. Hildebrand, R. D. Levine and J. Voldman, "Insect-machine interface: a carbon nanotube-enhanced flexible neural probe," J. Neurosci. Methods, vol. 204, no. 2, pp. 355-65, 2012.

[30] D. C. Daly, P. P. Mercier, M. Bhardwaj, A. L. Stone, Z. N. Aldworth, T. L. Daniel, J. Voldman, J. G. Hildebrand and A. P. Chandrakasan, "A Pulsed UWB Receiver SoC for Insect Motion Control," IEEE Journal of Solid-State Circuits, vol. 45, pp. 153-166, 2010.

[31] Y. Li, J. Wu and H. Sato, "Feedback Control-Based Navigation of a Flying Insect-Machine Hybrid Robot," Soft Robotics, vol. 5, pp. 365-374, 2018.

[32] H. Sato, C. W. Berry, Y. Peeri, E. Baghoomian, B. E. Casey, G. Lavella, J. M. VandenBrooks, J. F. Harrison and M. M. Maharbiz, "Remote radio control of insect flight," Frontiers in Integrative Neuroscience, 2009.

[33] L. Ricotti, B. Trimmer, A. W. Feinberg, R. Raman, K. Parker, R. Bashir, M. Sitti, P. Martel, P. Dario and A. Menciassi, "Biohybrid actuators for robotics: A review of devices actuated by living cells," Science Robotics, vol. 2, pp. 1-17, 2017.

[34] V. D. Shields and J. G. Hildebrand, "Responses of a population of antennal olfactory receptor cells in the female moth *Manduca sexta* to plant-associated volatile organic compounds," Journal of Comparative Physiology A, vol. 186, pp. 1135-1151, 2001.

[35] B. S. Hansson, M. A. Carlsson and B. Kalinova, "Olfactory activation patterns in the antennal lobe of the sphinx moth, *Manduca sexta*," Journal of Comparative Physiology A, vol. 189, pp. 301-308, 2003.

[36] A. M. Fraser, W. L. Mechaber and J. G. Hildebrand, "Electroantennographic and behavioral responses of the sphinx moth *Manduca sexta* to host plant headspace volatiles," Journal of chemical ecology, vol. 29, pp. 1813-1833, 2003.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated. reless transmitter.

What is claimed is:

1. A bio-hybrid odor-localizing autonomous air vehicle comprising:
   an airborne robotic platform, wherein airborne robotic platform comprises a drone copter having at least one rudder airfoil fixed to at least one rear motor mount that passively directs the drone copter in an upwind direction;
   a navigation platform coupled to the airborne robotic platform;
   a biological sensor mounted on the airborne robotic platform that reacts to at least one olfactory odor, wherein the biological sensor comprises an isolated, excised moth antenna;
   a controller communicatively coupled to the airborne robotic platform, the navigation platform, and the biological sensor, and which:
   monitors the biological sensor;
   in response to the biological sensor detecting the at least one olfactory odor, directs the airborne platform to map an olfactory plume of the at least one olfactory odor using an olfactory-driven search pattern.

2. The bio-hybrid odor-localizing autonomous air vehicle of claim 1, wherein the controller directs the airborne platform to three-dimensionally map the olfactory plume.

3. The bio-hybrid odor-localizing autonomous air vehicle of claim 1, further comprising a wireless transmitter communicatively coupled to the controller and a management console,
   wherein the controller transmit the map of the olfactory plume to the management console via the wireless transmitter.

4. The bio-hybrid odor-localizing autonomous air vehicle of claim 1, further comprising a memory communicatively coupled to the controller, wherein the controller records the map of the olfactory plume in the memory for later retrieval.

5. The bio-hybrid odor-localizing autonomous air vehicle of claim 1, wherein the navigation platform comprises an optical flow camera.

6. The bio-hybrid odor-localizing autonomous air vehicle of claim 1, wherein the navigation platform comprises an infrared (IR) rangefinder.

7. The bio-hybrid odor-localizing autonomous air vehicle of claim 1, wherein the biological sensor comprises a biological sensor that is genetically modified to detect the at least one olfactory odor.

8. The bio-hybrid odor-localizing autonomous air vehicle of claim 1, wherein the olfactory driven search pattern comprises an upwind orientation search pattern.

9. The bio-hybrid odor-localizing autonomous air vehicle of claim 1, wherein the olfactory driven search pattern comprises a cast-and-surge search pattern.

10. A bio-hybrid odor-localizing autonomous air vehicle comprising:
    an airborne robotic platform comprising drone copter, wherein airborne robotic platform comprises a drone copter having at least one rudder airfoil fixed to at least one rear motor mount that passively directs the drone copter in an upwind direction;
    a navigation platform coupled to the airborne robotic platform;
    a wireless transmitter communicatively coupled to a management console;
    a memory containing an olfactory-driven search pattern;
    a biological sensor mounted on the airborne robotic platform that reacts to at least one olfactory odor, wherein the biological sensor comprises an isolated, excised moth antenna; and
    a controller communicatively coupled to the airborne robotic platform, the navigation platform, the wireless transmitter, the memory, and the biological sensor, and which:
    monitors the biological sensor;
    in response to the biological sensor detecting the at least one olfactory odor, directs the airborne platform to map an olfactory plume of the at least one olfactory odor using an olfactory-driven search pattern;
    associates detection of the olfactory plume with a location based on the navigation platform;
    stores data of the mapping of the olfactory plume in the memory; and
    transmits a completed map to the management console using the wireless transmitter.

11. A method comprising:
    monitoring a biological sensor that reacts to at least one olfactory odor mounted on an airborne robotic platform of a bio-hybrid odor-localizing autonomous air vehicle, wherein airborne robotic platform comprises a drone copter having at least one rudder airfoil fixed to at least one rear motor mount that passively directs the drone copter in an upwind direction, wherein the biological sensor comprises an isolated, excised moth antenna;
    in response to the biological sensor detecting the at least one olfactory odor, directing the airborne platform to map an olfactory plume of the at least one olfactory odor using an olfactory-driven search pattern;
    associating detection of the olfactory plume with a location based on a navigation platform mounted on the airborne robotic platform; and
    storing data of the mapping of the olfactory plume in a memory.

12. The method of claim 11, further comprising: storing the data of the mapping of the olfactory plume in the memory mounted on the airborne robotic platform for later retrieval.

13. The method of claim 11, further comprising transmits a completed map to the management console using the wireless transmitter to the memory on a management console remote to the airborne robotic vehicle.

14. The method of claim 11, further comprising directing the airborne platform to map an olfactory plume of the at least one olfactory odor using a three-dimensional olfactory-driven search pattern.

15. The method of claim 11, further comprising directing the airborne platform to map an olfactory plume of the at least one olfactory odor using an upwind orientation search pattern.

16. The method of claim 11, further comprising directing the airborne platform to map an olfactory plume of the at least one olfactory odor using a cast-and-surge search pattern.

17. The method of claim 11, further comprising identifying a location of the airborne robotic platform using an optical flow camera of the navigation platform.

18. The method of claim 11, further comprising identifying a location of the airborne robotic platform using an infrared (IR) rangefinder of the navigation platform.

* * * * *